(12) United States Patent
Caprio

(10) Patent No.: US 7,828,359 B2
(45) Date of Patent: Nov. 9, 2010

(54) DETACHABLE SPLIT WINDSHIELD

(76) Inventor: Ray Caprio, 18 Benedict Crescent, Basking Ridge, NJ (US) 07920

( * ) Notice: Subject to any disclaimer, the term of this patent is extended or adjusted under 35 U.S.C. 154(b) by 312 days.

(21) Appl. No.: 11/859,343

(22) Filed: Sep. 21, 2007

(65) Prior Publication Data

US 2009/0079219 A1 Mar. 26, 2009

(51) Int. Cl.
*B62J 17/04* (2006.01)
(52) U.S. Cl. .................. 296/78.1; 296/96.21; 296/84.1
(58) Field of Classification Search ................ 296/78.1, 296/96.21, 84.1
See application file for complete search history.

(56) References Cited

U.S. PATENT DOCUMENTS

| | | | |
|---|---|---|---|
| 988,448 A | 4/1911 | Earl | |
| 1,387,349 A | 8/1921 | Campbell | |
| 2,237,594 A | 4/1941 | Dunlap | |
| 4,066,291 A | 1/1978 | Hickman | |
| 4,087,110 A | 5/1978 | Vetter | |
| 4,353,590 A | 10/1982 | Wei-Chuan | |
| 4,465,315 A | 8/1984 | Barstow | |
| 4,773,695 A | 9/1988 | Jones et al. | |
| 4,926,782 A | 5/1990 | Lacy | |
| 5,195,797 A | 3/1993 | Hobbs | |
| 5,203,277 A | 4/1993 | Norman | |
| 5,385,380 A | 1/1995 | Heavner | |
| 5,505,156 A | 4/1996 | Briggs | |
| RE35,757 E | 3/1998 | Heavner | |
| 5,732,965 A * | 3/1998 | Willey | 280/288.4 |
| 5,788,313 A * | 8/1998 | Willey | 296/78.1 |
| 5,791,720 A | 8/1998 | Moore et al. | |
| 5,853,217 A * | 12/1998 | Armstrong | 296/78.1 |
| 5,954,385 A | 9/1999 | Moore et al. | |
| 5,988,727 A * | 11/1999 | Mueller | 296/78.1 |
| 6,196,614 B1 * | 3/2001 | Willey | 296/78.1 |
| 6,254,166 B1 | 7/2001 | Willey | |
| 6,505,877 B1 | 1/2003 | Devlin et al. | |
| 6,663,158 B1 | 12/2003 | Showalter | |
| 6,808,219 B2 * | 10/2004 | Barber et al. | 296/78.1 |
| 7,165,802 B1 | 1/2007 | Flynn | |
| 7,213,533 B2 | 5/2007 | Gonzales | |
| 2003/0052031 A1 * | 3/2003 | Poore | 206/448 |

FOREIGN PATENT DOCUMENTS

| | | |
|---|---|---|
| JP | 05-124555 | 5/1993 |
| JP | 2003-154981 | 5/2003 |

OTHER PUBLICATIONS

Kim, Kwang Oh; Patent Cooperation Treaty Written Opinion of the International searching Authority for PCT Patent Application PCT/US2008/076481.
Kim, Kwang Oh; Patent Cooperation Treaty International Search Report for PCT Patent Application PCT/US2008/076481.

* cited by examiner

*Primary Examiner*—Joseph D Pape
(74) *Attorney, Agent, or Firm*—Mark Swanson; Frank M. Caprio; Bradley Arant Boult Cummings, LLP

(57) ABSTRACT

The current invention is a split windshield which can be stored on a vehicle or deployed into a single windshield to provide protection for a rider on the vehicle. The windshield includes an upper and lower portion and also includes an upper and lower frame attached to the upper and lower portion of the windshield. There are mounts for attaching the windshield to a vehicle.

19 Claims, 2 Drawing Sheets

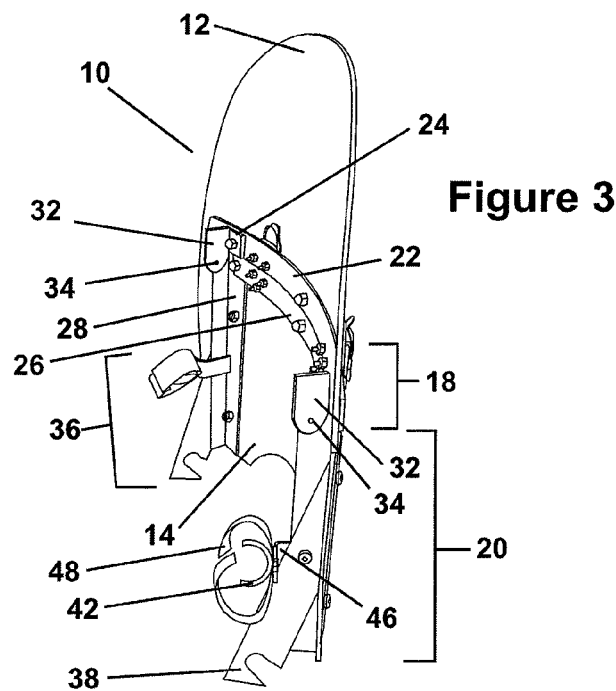
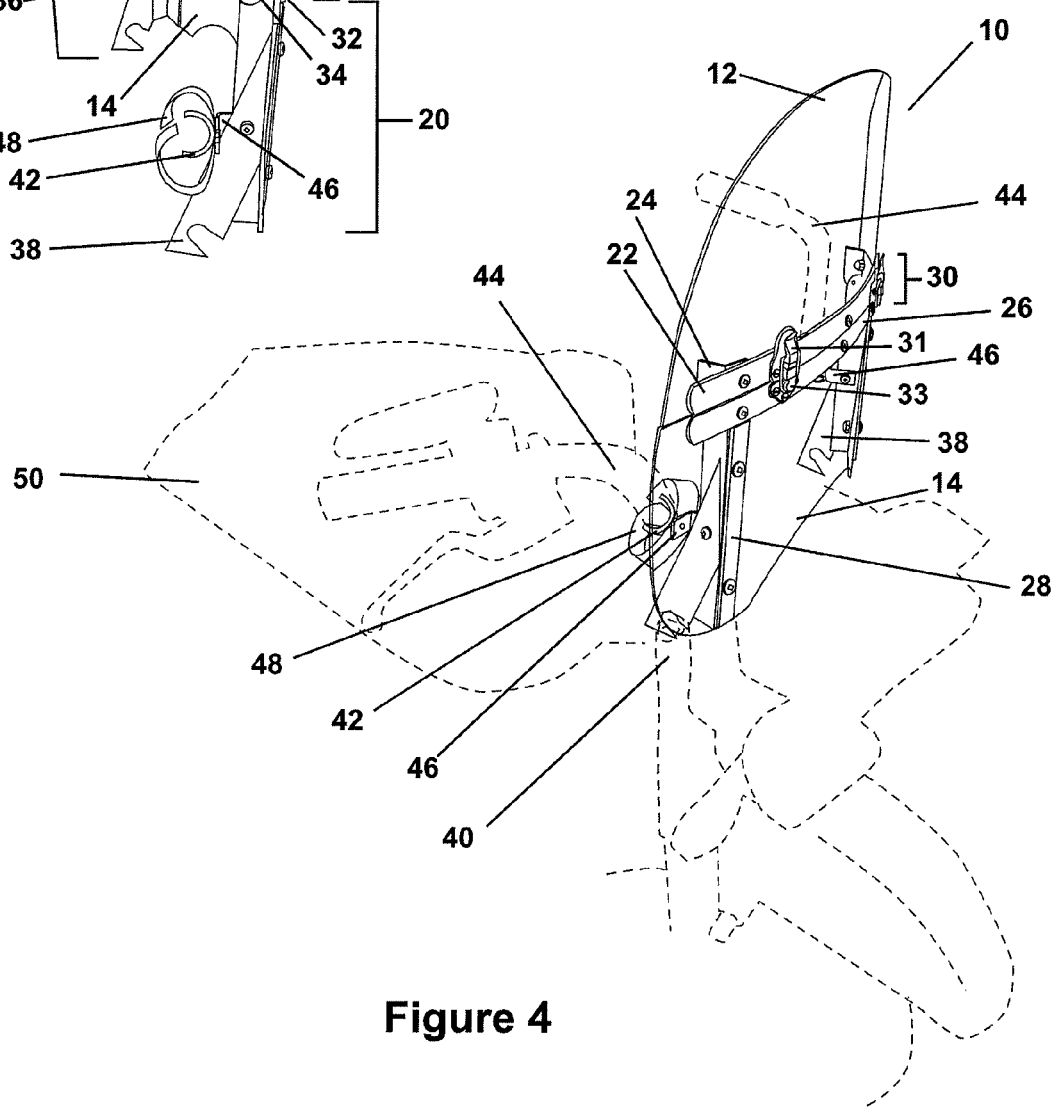

DETACHABLE SPLIT WINDSHIELD

BACKGROUND OF THE INVENTION

1. Field of the Invention

This invention relates to split windshields which can be detached from a vehicle, and stored for use when desired.

2. Description of the Related Art

Windshields have been used for many years on various types of vehicles. Windshields protect a vehicle occupant from the apparent wind produced by the motion of the vehicle through the air. A vehicle occupant is also protected from any objects in the air, such as rain or bugs, which could otherwise strike the occupant. Windshields are very common on four wheeled automobiles, but many motorcycles don't use windshields because the rider enjoys the open, exposed nature of the motorcycle. However, a motorcycle rider may desire a windshield at certain times, such as if rain begins to fall while riding. Generally, the windshields provided with motorcycles are designed to be relatively permanent fixtures, and cannot be quickly and simply mounted and removed. This means the motorcycle rider has to choose essentially to always use a windshield, or to never use a windshield.

There are foldable windshields currently in existence. For example, many golf carts can be purchased with a foldable windshield which can be used to provide open air transportation or protected transportation, depending on whether or not the windshield is folded open or closed. These foldable windshields are generally relatively permanent fixtures on a golf cart, and are not designed to be quickly mounted or removed.

U.S. Pat. No. 4,465,315 by Barstow describes a foldable windshield for a motorcycle. This windshield includes a continuous hinge which allows the windshield to be folded to various positions. The motorcycle rider can then select the position providing the desired amount of exposure of the rider to the wind. Barstow does describe a system for quickly attaching and removing the windshield from a motorcycle without the use of tools.

SUMMARY OF THE INVENTION

The current invention includes a split windshield with releasable mounts. The mounts are configured to engage a vehicle, such as a motorcycle. The windshield is split such that it can be collapsed when removed from the vehicle, and stored for later use. There is at least an upper and lower windshield, and there is a frame attached to the upper and lower windshield. The windshield is designed to be assembled into a single piece when mounted on the vehicle for use. Other aspects and advantages of the invention will be apparent from the following description and the appended claims.

BRIEF DESCRIPTION OF THE DRAWINGS

FIG. 3 depicts an alternate perspective view of the windshield when assembled for use.

FIG. 4 depicts a perspective view of the assembled windshield mounted on a motorcycle, with the motorcycle shown in dashed lines.

DETAILED DESCRIPTION

Split Windshield

Figure 1:
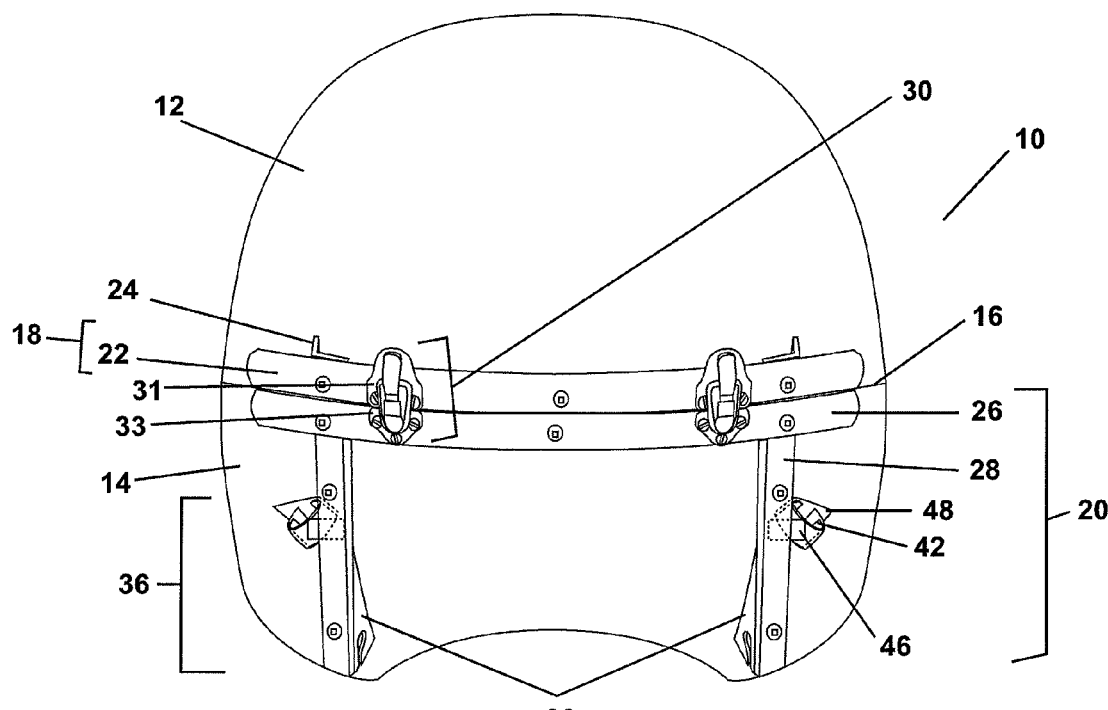
FIG. 1 depicts a front view of the windshield when assembled for use.
Figure 2:
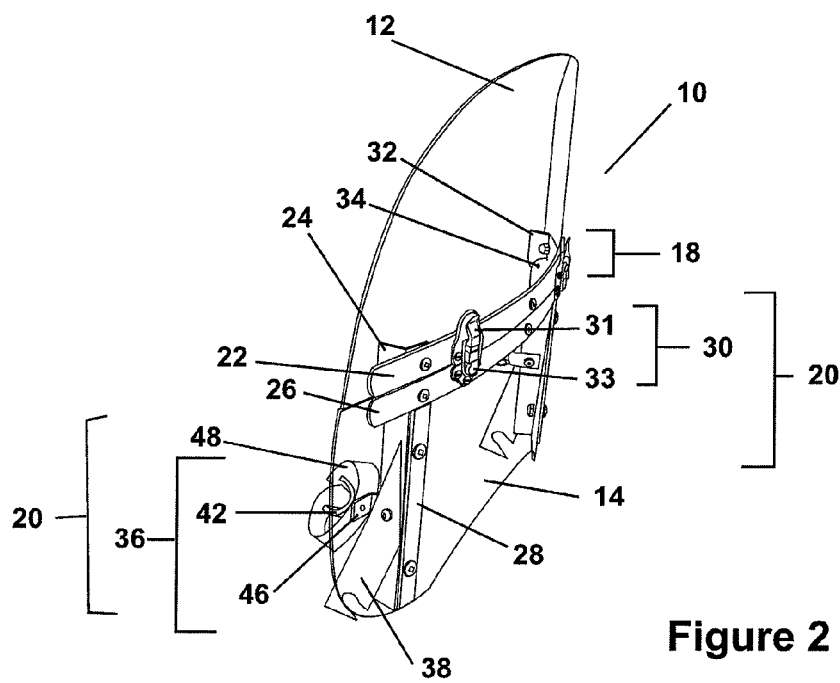
FIG. 2 depicts a perspective view of the windshield when assembled for use.

The windshield 10 of the current invention has at least two parts including an upper windshield 12 and a lower windshield 14, as seen in FIGS. 1 and 2. Therefore, the windshield 10 is a split windshield 10. If an embodiment of the current invention is utilized with more than two parts, the term upper windshield 12 refers to a windshield portion which is above an adjacent windshield portion, which is referred to as the lower windshield 14. Where the upper windshield 12 and the lower windshield 14 abut or face each other, when assembled to form a single overall windshield 10, is a windshield union 16.

The windshield 10 has an attached frame which includes an upper frame 18 and a lower frame 20. The upper frame 18 is connected to the upper windshield and the lower frame 20 is connected to the lower windshield 14. Preferably, bolts are used to connect the upper and lower frames 18, 20 to the upper and lower windshields 12, 14. It is possible to use some resilient material or gasket material between the frame and the windshield 10. The windshield union 16 runs approximately horizontal when the windshield 10 is mounted on a vehicle. Therefore, the upper frame 18 and the lower frame 20 include horizontal portions approximately at the windshield union 16.

The upper frame 18 includes an upper frame horizontal portion 22, and may include an upper frame vertical portion 24, where the upper frame vertical portion may or may not extend beyond the upper frame horizontal portion 22. The upper frame vertical portion 24 as well as the upper frame horizontal portion 22 are connected to the upper windshield 12, preferably by the use of bolts. The lower frame 20 includes a lower frame horizontal portion 26 as well as at least one lower frame vertical portion 28, similar to the upper frame 18. As with the upper frame 18, the lower frame horizontal portion 26 and the lower frame vertical portion 28 are connected to the lower windshield 14, preferably with the use of bolts. The horizontal portions of the frame 22, 26 may be comprised of strips of material, such as metal, on both sides of the windshields 12, 14. Therefore, the upper windshield 12 would be sandwiched between two strips of material which form the upper frame horizontal portion 22, with the same sandwiching effect for the lower windshield 14 and lower frame horizontal portion 26.

In one embodiment of the current invention the upper windshield 12 and the lower windshield 14 come apart to form two separate, distinct pieces. To provide protection for the vehicle occupant, the upper and lower windshield 12, 14 need to be secured together when the windshield 10 is in use. At least one connector 30 and preferably two connectors 30 are used to secure the upper and lower windshield 12, 14 together when the windshield 10 is in use. The connector 30 is comprised of an upper and lower portion 31, 33, wherein the connector upper portion 31 is attached to the upper frame 18, and the connector lower portion 33 is attached to the lower frame 20. In this embodiment, the upper and lower windshield 12, 14 are separate when the upper and lower portions of the connector 31, 33 are not connected.

Many different types of connector 30 can be used. For example, draw latches can be used to help draw the upper and lower windshield 12, 14 together, thereby making a more secure windshield union 16. Buckles, straps, or other forms of connector 30 could also be used. The connector 30 serves to secure the position of the upper and lower frame 18, 20, and therefore the upper and lower windshield 12, 14, in a fixed position relative to each other. It is possible that the upper windshield 12 or the upper frame horizontal portion 22 has one or more pins (not shown) and the lower windshield 14 or the lower frame horizontal portion 26 have recesses (not shown) into which the pins fit to better position the upper and lower windshield 12, 14 when secured together. The position of the pins and recesses could also be reversed.

The windshield 10 may be curved, especially from side to side. The curvature of the windshield helps to secure the upper and lower windshield 12, 14 together because the connectors 30 hold the upper windshield 12 to the lower windshield 14 and the curvature provides abutting surfaces in two different dimensions (side to side and also forward and backwards). If the windshield 10 were flat, there could be a tendency for the windshield 10 to bend about the union 16, due to any slight stretch or play in the connectors 30. The curvature of the windshield 10 provides an abutting surface in the union 16 which is behind the connectors 30. This abutting surface serves as a fulcrum and minimizes the bending effect of the windshield 10 about the union 16. The curvature of the windshield 10 provides the additional advantage of reducing wind resistance and deflecting wind from a rider or vehicle occupant.

In an alternative embodiment, the upper and lower windshield 12, 14 are connected by at least one hinge 32, as best seen in FIGS. 1 and 3. Preferably the windshield 10 would include two hinges 32, one on each side of the windshield 10. The hinge 32 is preferably a knife hinge and is formed by a rivet 34 at the intersection of the upper and lower frames 18, 20. In this embodiment, the windshield 10 would fold or pivot about the hinge 32. The windshield 10 would still be held together in a single piece by the connectors 30, as in the previous embodiment. In this embodiment, the upper and lower windshield 12, 14 would also be connected through the hinge 32. Therefore, if a hinge 32 is used, the connectors 30 are still in place and are used to hold the upper and lower windshield 12, 14 together as one solid windshield 10. The hinge 32 serves as a secondary means of holding the windshield 10 together.

The windshield 10 is split into at least two portions. One reason for the split is to facilitate the storage of the windshield 10 when not in use. Therefore, it is preferred that each portion of the windshield 10 will be approximately the same height as each other portion. Similarly sized windshield portions 12, 14 provide the largest assembled windshield 10 based on a given storage area. Height refers to the vertical distance which would be measured approximately perpendicular to the windshield union 16. The design of the windshield 10 should be such that the windshield union 16 is below the normal line of sight of a rider on the vehicle or motorcycle.

Vehicle Connection

The windshield 10 is intended to be mounted or connected to a vehicle wherein the vehicle is preferably a motorcycle 50, as best seen by referring to FIGS. 1, 3, and 4. The windshield 10 includes mounts 36 which are attached to the frame, and preferably attached to the lower frame 20. The mounts 36 are configured to releasably engage the vehicle 50, so the mounts 36 are releasable mounts 36. Preferably the windshield 10 will include two different types of mounts 36. One type of mount 36 is the bushing mount cutout 38, which is configured to releasably engage a motorcycle's forks 40. To facilitate the connection between the bushing mount cutout 38 and the motorcycle fork 40, fixtures can be installed on the top of the motorcycle fork 40. Examples of fixtures that may be used include button head bolts, bushings, specially adapted connectors, or it is possible that the bushing mount cutouts 38 can be designed to fit a motorcycle fork 40 without the use of any specially designed fixture.

Preferably, a non-marring material will be positioned between the bushing mount cutout 38 and the motorcycle fork 40. One example of non-marring material would be a rubber grommet sleeve, but other protective layers can be used. The purpose of this protective layer is to prevent scrapes and scratches on the motorcycle fork 40 as well as reducing vibration through the bushing mount cutout 38 to the windshield 10. The bushing mount cutouts 38 are slid over the motorcycle forks 40 to form part of the connection between the windshield 10 and the motorcycle.

A second type of mount 36 is the handlebar clamp 42. The handlebar clamp 42 is also connected to the lower frame 20 and is used to secure the lower frame 20 to a handlebar 44 of the motorcycle 50. Preferably, the handlebar clamp 42 includes a clamp rod 46 and an end clamp 48. Other forms can used, as long as the handlebar clamp 42 is configured to releasably engage the motorcycle handlebar 44. The clamp rod 46 may pivot on the lower frame 20 such that the clamp rod 46 can move in a vertical direction about a pivot point on the lower frame 20. The end clamp 48 is received at an end of the clamp rod 46 and is used to engage the motorcycle handlebar 44.

The end clamp 48 can be one of a variety of different devices. Some examples include hook and loop fasteners, spring steel clamps, a seat with a thumb screw, or a curved grip with a buckle or latch. If the end clamp 48 is relatively rigid, it can be mounted on a ball and socket pivot such that the spring steel end clamp 48 can pivot in any direction relative to the clamp rod 46. Spring steel clamps would snap around the motorcycle handlebar 44 to form the clamp and secure the windshield 10 to the motorcycle. Preferably some sort of protective material, such as rubber, will be utilized between the end clamp 48 and the motorcycle handlebar 44 to prevent scratches on the handlebar and to minimize vibrations transferred from the motorcycle to the windshield 10 through the handlebar clamp 42.

Windshield Use

The bushing mount cutout 38 is connected to the motorcycle fork 40 and the handlebar clamp 42 is connected to the handlebar 44 without the use of any tools. This provides for a very quick and easy connection of the windshield 10 to the motorcycle 50. The entire windshield unit 10 can also be removed from the motorcycle 50 without the use of tools. Because of this, the windshield 10 can be rapidly deployed in position and rapidly taken down and stored, so the windshield 10 is easy to use and convenient for the user. Deployment times of about 20 seconds are possible, with similar take down times.

It is intended that the windshield 10 be removed and stored on the motorcycle 50 when the motorcycle 50 is in use. Because of this, the design is such that the split windshield 10 will fit in a container mounted on the motorcycle, such as a motorcycle touring bag. Most motorcycle mounted containers do not exceed dimensions of about 25 inches by about 17 inches by about 12 inches. It is preferred that the tallest windshield portion have a height which is not over about 15 inches, and the upper and lower windshield 12, 14 should be about the same height. The preferred dimensions are about 11 inches high by 18½ inches wide for both the upper and lower windshield 12, 14. These dimensions facilitate the storage of the windshield 10 in a motorcycle mounted container.

Since the windshield 10 is designed to be stored, carried, and rapidly deployed from a motorcycle mounted container, the materials for the construction of the windshield 10 will be chosen with low weight in mind. Preferably, the upper and lower windshields 12, 14, the upper and lower frames 18, 20, and the mounts 36 combined do not exceed a total weight of about five pounds. The additional weight of the connectors 30 and/or hinges 32 would not increase the weight over about five pounds.

Polished metal which is resistant to oxidation is the preferred material for the upper and lower frame 18, 20. The mounts 36 could be the same polished metal, with the addition of a resilient material, such as rubber, to minimize scratches and vibration. The upper and lower windshield 12, 14 could be constructed from a polycarbonate resin thermoplastic. Other materials could be used as long as the function of each part is not compromised.

It is intended that the current invention be produced in a variety of sizes to fit many different motorcycles 50. Because the mounts 36 are adjustable, one size will fit a variety of motorcycles 50. Therefore, a limited number of windshield sizes could be used on a much larger number of motorcycle models. The windshield 10 would be constructed to meet legal requirements for windshields.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A split windshield comprising:
    releasable mounts configured to engage a motorcycle, wherein the mounts further comprise handlebar clamps and bushing mount cutouts, wherein the handlebar clamps are configured to releasably engage motorcycle handlebars, wherein the bushing mount cutouts are configured to releasably engage motorcycle forks, and wherein the bushing mount cutouts have no moving parts;
    a frame attached to the windshield, wherein the mounts are attached to the frame such that the windshield can fit within a motorcycle mounted container; and
    a connector with an upper and lower portion, wherein the windshield further comprises an upper and lower windshield, the frame further comprises an upper and a lower frame, the upper windshield is connected to the upper frame, the lower windshield is connected to the lower frame, the upper portion of the connector is connected to the upper frame, the lower portion of the connector is connected to the lower frame, the connector secures the upper and lower frames together, and the connector is a draw latch.

2. The windshield of claim 1 wherein the upper and lower windshield are separate when the upper and lower connector is portions are not connected.

3. A split windshield comprising:
    releasable mounts configured to engage a motorcycle, wherein the mounts further comprise handlebar clamps and bushing mount cutouts, wherein the handlebar clamps are configured to releasably engage motorcycle handlebars, wherein the bushing mount cutouts are configured to releasably engage motorcycle forks, and wherein the bushing mount cutouts have no moving parts;
    a frame attached to the windshield, wherein the mounts are attached to the frame such that the windshield can fit within a motorcycle mounted container; and
    a hinge, wherein the windshield further comprises an upper and lower windshield, and the upper and lower windshields are connected through the hinge.

4. A split windshield comprising:
    an upper windshield and a lower windshield;
    a frame including an upper frame attached to the upper windshield and a lower frame attached to the lower windshield;
    at least one connector including an upper portion connected to the upper frame and a lower portion connected to the lower frame, wherein the connector is a draw latch; and
    releasable mounts configured to engage a vehicle, wherein the mounts are attached to the frame, wherein the mounts further comprise handlebar clamps and bushing mount cutouts, wherein the handlebar clamps are configured to releasably engage motorcycle handlebars, wherein the bushing mount cutouts are configured to releasably engage motorcycle forks, and wherein the bushing mount cutouts have no moving parts.

5. The windshield of claim 4 wherein the windshield includes at least two parts, and the tallest windshield part has a height of no more than about 15 inches.

6. The windshield of claim 4 wherein the total weight of the mounts, windshield, and frame is less than 5 pounds.

7. The windshield of claim 4 where the windshield is curved such that the connector secures the upper and lower frame in a fixed position relative to each other.

8. The windshield of claim 7 wherein the upper and lower windshields are separate when the upper and lower connector is not connected.

9. The windshield of claim 4 further comprising a hinge, wherein the windshield further comprises an upper and lower windshield, and the upper and lower windshields are connected through the hinge.

10. The windshield of claim 4 where the connector comprises at least two connectors.

11. The windshield of claim 4 wherein the windshield can be secured on a motorcycle without the use of tools.

12. A split windshield comprising:
    at least an upper windshield and a lower windshield;
    releasable mounts configured to engage a vehicle;
    an upper frame attached to the upper windshield;
    a lower frame attached to the lower windshield, wherein the mounts are attached to the lower frame; and
    at least one connector, wherein the connector includes an upper portion connected to the upper frame and the connector includes a lower portion connected to the lower frame, wherein the connector secures the upper and lower frame in a fixed position relative to each other, and wherein the connector is selected from the group consisting of a draw latch, a buckle, and a strap.

13. The windshield of claim 12 wherein the windshield includes at least two parts, and the tallest windshield part has a height of no more than about 15 inches.

14. The windshield of claim 12 wherein the mounts further comprise handlebar clamps and bushing mount cutouts, wherein the handlebar clamps are configured to releasably engage motorcycle handlebars, wherein the bushing mount cutouts are configured to releasably engage motorcycle forks, and wherein the bushing mount cutouts have no moving parts.

15. The windshield of claim 12 wherein the upper and lower windshield are separate when the upper and lower connector is not connected.

16. The windshield of claim 12 wherein the total weight of the windshield, frame, connector and mounts is less than about 5 pounds.

17. The windshield of claim 12 further comprising a hinge, wherein the upper and lower windshields pivot about the hinge.

18. The windshield of claim 12 wherein the windshield is curved.

19. The windshield of claim 12 wherein the vehicle is a motorcycle.

\* \* \* \* \*